May 26, 1942.　　　F. R. HIGLEY　　　2,283,990
DRUM TYPE DEHUMIDIFIER
Filed Dec. 27, 1938　　5 Sheets-Sheet 1
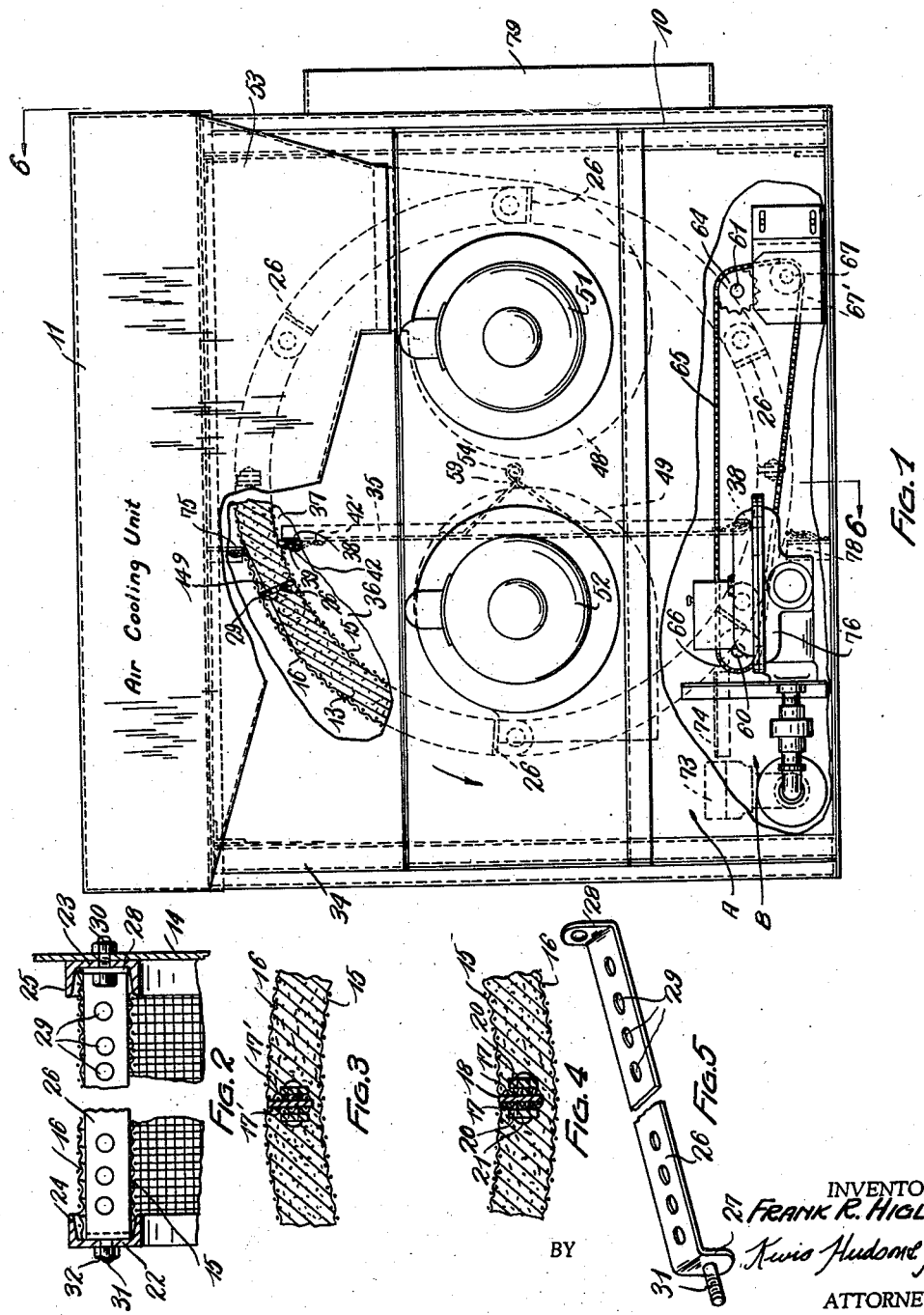
INVENTOR.
FRANK R. HIGLEY
BY Kwio Hudome Kent
ATTORNEYS May 26, 1942.  F. R. HIGLEY  2,283,990
DRUM TYPE DEHUMIDIFIER
Filed Dec. 27, 1938  5 Sheets-Sheet 2
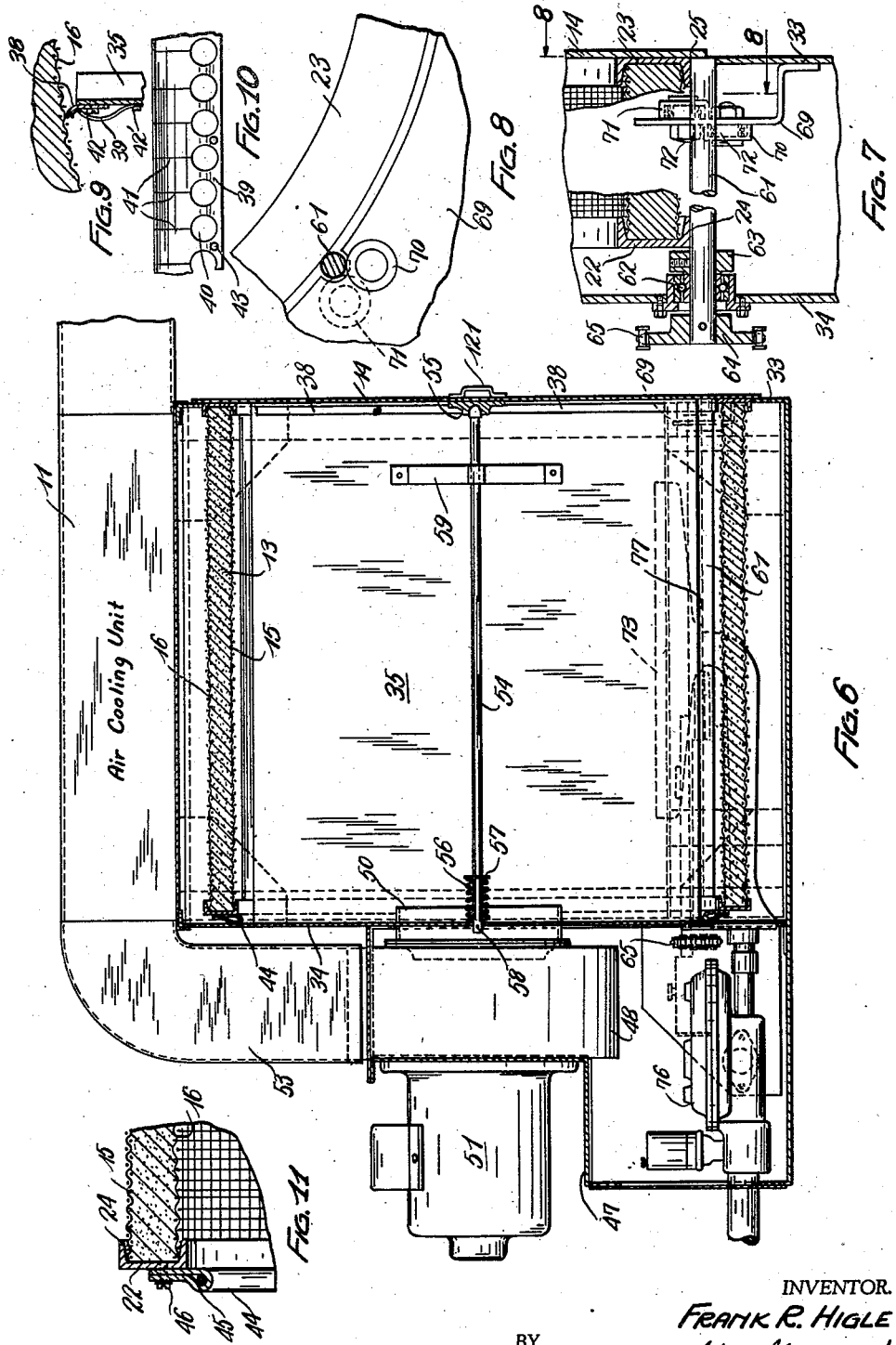
INVENTOR.
FRANK R. HIGLEY
BY
ATTORNEYS

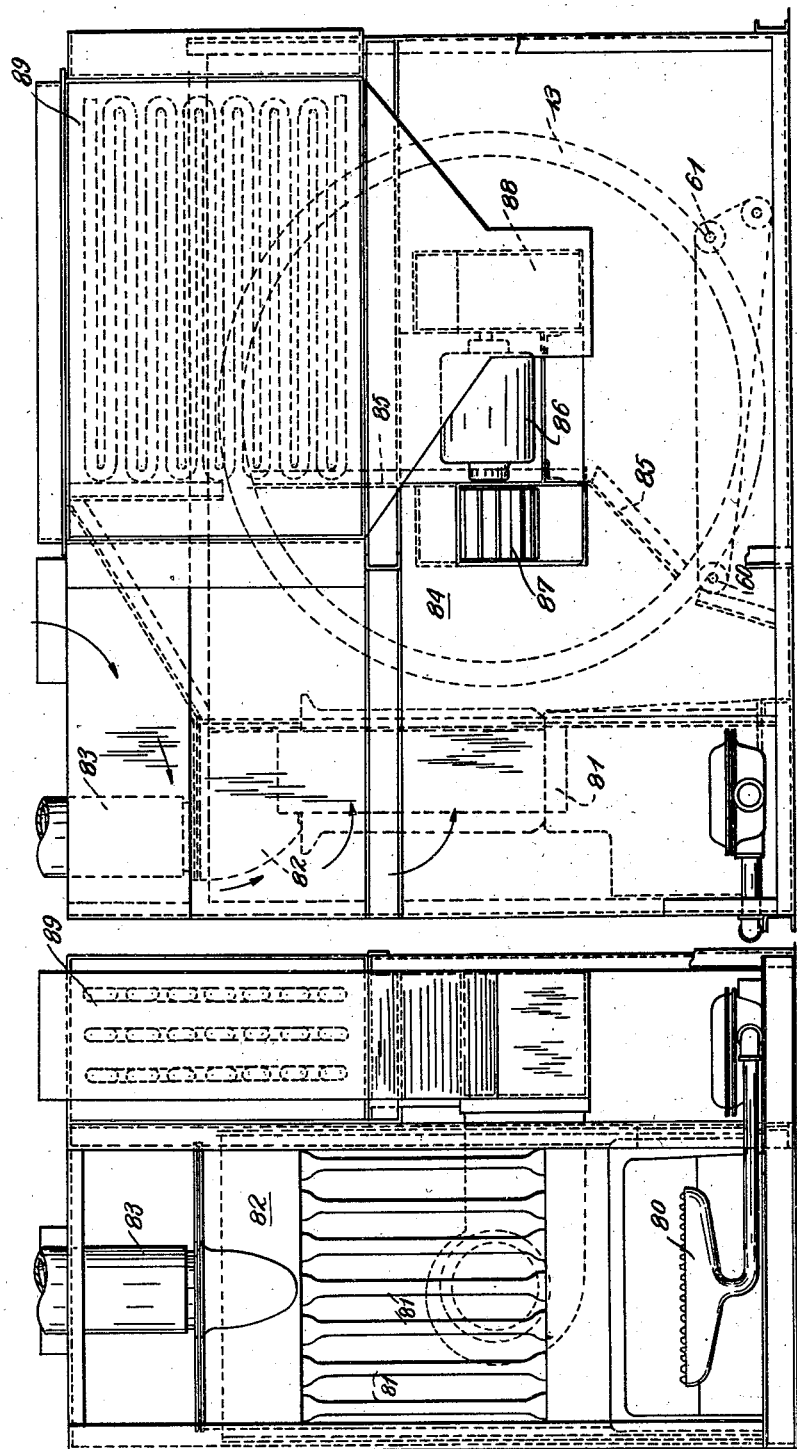

May 26, 1942.  F. R. HIGLEY  2,283,990
DRUM TYPE DEHUMIDIFIER
Filed Dec. 27, 1938  5 Sheets-Sheet 4

INVENTOR.
FRANK R. HIGLEY
BY
Kwis Hudson & Kent
ATTORNEYS

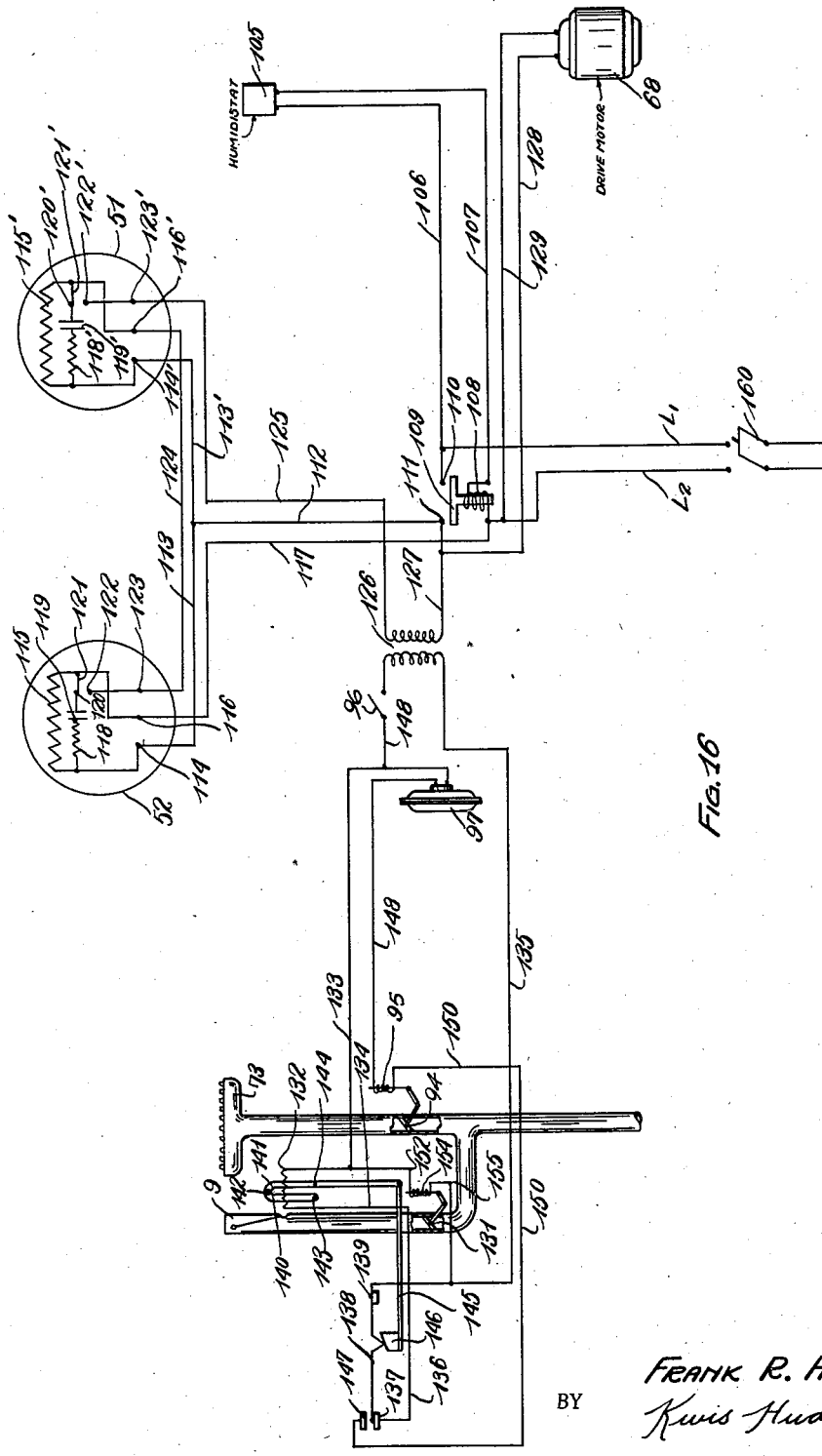

Patented May 26, 1942

2,283,990

UNITED STATES PATENT OFFICE 2,283,990

DRUM TYPE DEHUMIDIFIER

Frank R. Higley, Cleveland Heights, Ohio, assignor to The Bryant Heater Company, Cleveland, Ohio, a corporation of Ohio Application December 27, 1938, Serial No. 248,019

15 Claims. (Cl. 183—4)

This invention relates to improvements in drum type dehumidifiers, that is to say dehumidifiers in which the adsorbent material, generally either silica gel or activated alumina, is carried by the cylindrical wall of a drum which is caused to rotate about its axis in order to expose all of the adsorbent material during any given revolution first to the air to be conditioned and later to the activating medium. In certain of its aspects the invention also contemplates the use of rotating or revolving carriers for the adsorption material which are of other than drum shape but which function in a generally similar manner.

One of the objects of the invention is the simplification of dehumidifying apparatus with a resultant saving in the cost of manufacture and operation.

Another object is the provision of apparatus of such character that the period devoted to adsorption may be made longer than that devoted to activation.

Another object is the provision of apparatus which operates continuously without shifting the direction of air travel and with a minimum number of bends in the air paths.

Another object is the provision of apparatus in which a portion of the cycle may be devoted to purging without interrupting the activating process.

Another object is the provision of indirect heating means for the activating air so that no products of combustion are caught by the adsorbent material and the need for a purge period is thereby overcome.

Another object is the provision of a moving carrier for the adsorbent material which has the incidental function of causing the particles of adsorbent material to move upon one another, thereby loosening them, enabling dust to be blown out, and counteracting any tendency of the particles to pack together and unduly resist the passage of air therethrough.

A further object is the provision of a safety control for preventing the activating heater from functioning until the blower for circulating air through the activating compartment is running, and as a second safety control, the provision of means for preventing the operation of the blower which circulates the air to be conditioned unless and until the blower for the activating compartment is operating, the control being such that if any leakage shall occur as between the two compartments it shall take place in the direction away from the adsorbing compartment and toward the activating compartment, thereby keeping odors and impurities out of the circulating air.

Still another object of the invention is the provision of the apparatus in units which may be differently arranged for different installations, together with means for mounting the blowers so that their delivery ends may be caused to take different directions, and bends in the conductors outside of the apparatus may be held to a minimum.

Other objects and details of construction will appear as I proceed with the description of those embodiments of the invention which, for the purposes of the present application, I have illustrated in the accompanying drawings, in which—

Fig. 1 is a front view, partially broken away, of a dehumidifying apparatus embodying the invention.

Fig. 2 is a fragmental detail sectional view of a drum which may be employed in connection with the invention, the section being taken lengthwise of the drum.

Figs. 3 and 4 are detail sectional views of the drum taken on a transverse plane.

Fig. 5 is a perspective view of a brace constituting part of the drum.

Fig. 6 is a side elevation, partly in vertical section, of the construction illustrated in Fig. 1.

Fig. 7 is a detail sectional view, on a larger scale, illustrating the supporting and driving means for the drum.

Fig. 8 is a fragmental detail view taken substantially on the line 8—8 of Fig. 7.

Fig. 9 is a detail view illustrating a method of sealing one of the joints between fixed and moving parts.

Fig. 10 is a front view of the metal backing for the packing strip illustrated in Fig. 9.

Fig. 11 is a detail sectional view illustrating a gasket or packing which may be employed to seal the joint between the open end of the drum and the fixed front wall of the dehumidifier.

Figs. 12 and 13 are front and side elevational views, respectively, of a modified form of the invention.

Fig. 16 is a wiring diagram illustrating control means which may be employed in connection with the invention.

Figure 14:
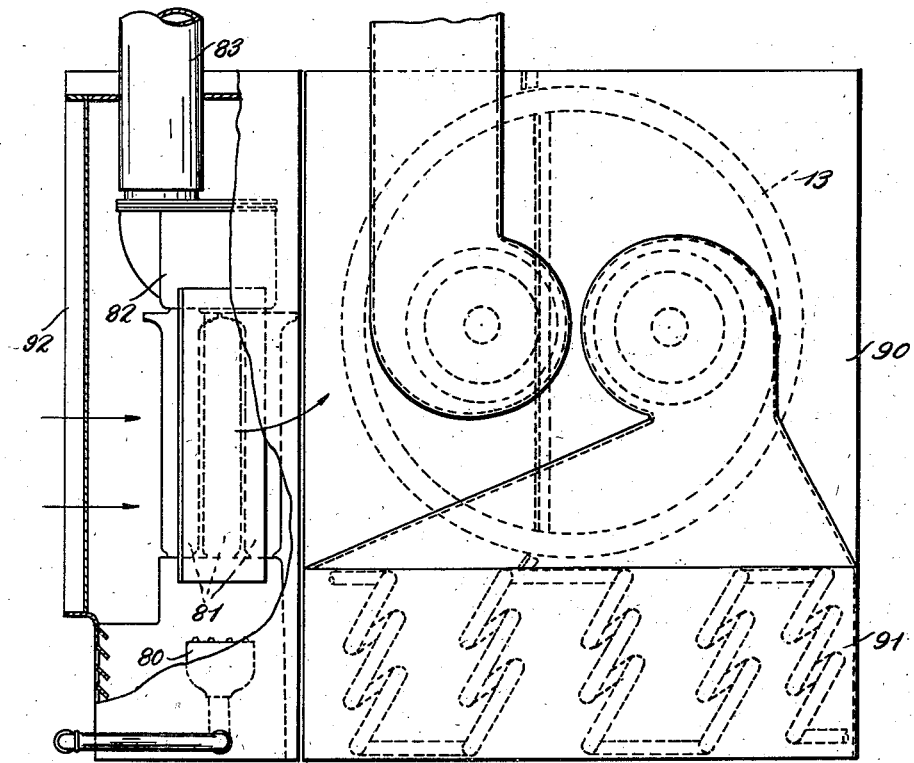
Fig. 14 is a front elevational view of another form of the invention.

Referring first to Figs. 1 to 11 inclusive, I have illustrated at 10 the casing of a dehumidifier unit and at 11 a cooling unit comprising a casing which rests upon the top of casing 10. Within the casing 10 there is mounted to turn upon a horizontal axis a drum 13 which is closed at its rear end by a circular metal plate 14 and is open at its front end. The drum is exteriorly supported and driven, by means which will presently appear, and it carries on its cylindrical portion the adsorbent material which is to be utilized for dehumidifying purposes. While in the illustrated embodiment of the invention I employ a drum as the rotating carrier for the adsorbent material, I desire it to be understood that other forms of carrier, in which there is a surface of revolution, as for example, a cone, or a hemisphere, may be employed more or less effectively and are intended to be included in some of the broader aspects of the invention.

When, as in the illustrated embodiment, the carrier for the adsorbent material is a drum, it may be advantageously constructed as disclosed herein. The cylindrical portion of the drum in the present instance comprises two concentric cylinders 15 and 16 of foraminous or other perforate material. The inner cylinder 15 is preferably made from a sheet of relatively fine screen cloth, rolled up to a cylindrical shape with the adjacent ends of the cloth flanged outwardly, as shown at 17 in Fig. 4, and fastened together, with a metal strip 18 interposed between the flanges. Outside the flanges 17 I may mount strips 20. Bolts or rivets 21 extend through aligned openings in the parts 17, 18 and 20, and serve to bind these parts together and securely clamp the flanges 17. The outer cylinder 16 is similarly formed except that its flanges 17' are bent inwardly rather than outwardly. In both cases the flanges and the clamping strips are of less width than the distance between the cylinders, and hence leave a passage for the granular adsorbent material to move past the joint.

The ends of the cylinders 15 and 16 are caused to take positions within front and rear rings 22 and 23 respectively. These rings have inner and outer surfaces in planes perpendicular to the axis of the drum and are preferably channel shaped in cross section with the channel flanges of one ring facing those of the other ring. The flanges of course center the ends of the cylinders and thereby assist in assembly as well as in forming good end joints. The outer flanges 24 and 25 of the two rings constitute circular tracks for engagement with the supporting and driving means presently to be described.

At regularly spaced intervals around the drum the two rings 22 and 23 are connected by braces 26 which are formed of strap iron with bent ends or feet 27 and 28 to engage the inner faces of the rings. These braces are made of a width equal to the spacing of the two cylinders, and therefore brace the cylinders throughout the length of the drum, preventing the distortion and maintaining the uniform spacing of the cylinders. In order that the braces may not interfere with the movement of the particles of adsorbent material, each brace is perforated at short intervals throughout its length as indicated at 29. The foot 28 of each brace is connected with ring 23 and with back plate 14 by a bolt 30. In assembly the ring 23 is laid upon the back plate 14, the braces 26 are put in position and fastened with the bolts 30, after which the two cylinders are placed in position. Adsorbent material is then poured into the space between the cylinders until that space is filled. The feet 27 of the braces 26 have threaded pins 31 projecting therefrom. The ring 22 is then fitted over the open end of the drum and the pins 31 are caused to extend through previously drilled openings in the web of the ring, after which nuts 32 are threaded down on the pins and the assembled parts become a rigid drum.

The rear wall 33 of the casing 10 has a circular opening therein of a diameter slightly greater than the external diameter of the ring 23, while the circular back plate 14 of the drum is large enough to overlap the edges of this opening. Casing 10 has a front wall 34 to which is secured by bolts, rivets or welding a metal partition 35 which extends longitudinally through the drum to the back plate 14 thereof and divides the interior of the drum into two compartments 36 and 37. It is important that the upper, lower and rear edges of this partition be sealed against the adjacent moving surfaces of the drum, and this result I accomplish by the yieldable gasket construction illustrated in detail in Figs. 9 and 10. As herein shown a flexible asbestos strip 38 is secured to the partition. This strip has a backing strip 39 of bronze or the like divided into individual resilient fingers by perforations 40 and slits 41, the asbestos strip being secured to the partition by screws or the like 42 and the metal strip overlapping the asbestos strip and being secured separately to the metal partition by screws 42'. The packing strips 38 at the top and bottom of the partition 35 are turned in opposite directions, as shown in Fig. 1, in order to cooperate properly with the moving cylinder 16, and at the back of the partition there are preferably two packing strips meeting at the middle, one turned one way and one the other.

An annular seal is provided at the forward open end of the drum, shown in Figs. 6 and 11. It may consist of a strip of asbestos cloth 44 doubled on itself around a length of asbestos rope 45. The gasket thus formed is secured to ring 22 at intervals throughout the circumference by suitable fastenings 46, and the enlargement or roll at the fold bears resiliently on the rear face of the casing front wall 34.

In front of the casing 10 there is a supplemental casing 47 in which are supported two fans or blowers 48 and 49 having their intakes through collars or sleeves 50 that extend through circular openings in the wall 34 on opposite sides of the partition 35. Connected with the shafts of the blowers are electric motors 51 and 52 respectively. The blowers may be mounted with either side forward and the direction of rotation of the motors may be reversed so as to properly drive the blowers in either position. Each blower may be turned about its axis to bring its delivery end into any one of several different radial positions. As shown in Fig. 1 the blower 48 delivers upwardly and the blower 49 delivers horizontally. If it were desired to have the blower 48 deliver downwardly without disturbing blower 49 it would be necessary to reverse blower 48, because if an attempt were made to merely turn it around 180° its large delivery end would interfere with blower 49. Hence provision for the reversal of the blowers is important. As shown in Figs. 1 and 6, blower 48 takes air from the larger compartment 37 and delivers it through a flared connection 53 into the cooling unit 11 supported on top of the casing 10. The other blower 49 takes air from the smaller compartment 36 and delivers it to a chimney or other convenient exhausting means (not shown).

When the blowers 48 and 49 are in operation the suction thereby created, working on the closed rear end of the drum, exerts a forward pull on the drum tending to press the packing 44 tightly against the wall 34 and to create heavy friction. In order to reduce this friction and the power requirements for the rotation of the drum I employ a rod 54, the rear end of which is seated in a socket 55 mounted at the center of the plate 14, the forward end of the rod bearing directly or indirectly against the front wall 34 of the casing. As illustrated herein the latter bearing is resilient, it being effected by a spiral spring 56 surrounding the rod, bearing at one end against a collar 57 on the rod and at the other end against wall 34. The rod extends loosely through a hole in the wall 34 and may be provided with a pin 58 to prevent the spring from pulling the rod free of the wall 34. Of course it will be understood that other types of bearings may be used at the ends of the rod and that provision for adjustment may be included if desired so that the compression of gasket 44 may be regulated to a nicety.

I take advantage of the presence of rod 54 to provide a support for the rear end of partition 35 by mounting upon the partition near its rear end a bracket 59 which is formed to snugly receive the rod 54.

As previously stated the drum is exteriorly supported and driven. To this end I provide two shafts 60 and 61 of small diameter which are mounted parallel to each other and spaced apart a distance such that when the drum rests upon them it will be stable. Each of these shafts is mounted at its forward end in suitable bearings carried by the front wall 34 of the casing, and is held from longitudinal movement in that bearing as will be evident from an inspection of Fig. 7, where a ball bearing 62 is illustrated with a locking collar 63 secured to the shaft on one side of the bearing and a sprocket wheel 64 secured to it on the other side of the bearing. A chain 65 runs over sprocket wheel 64, over a similar sprocket wheel 66 on the other shaft, and over a sprocket wheel 67 on the output shaft of reduction gear box 67' driven by small motor 68, indicated diagrammatically in Fig. 15. These two shafts are therefore driven in the same direction and at the same speed.

The rear ends of shafts 60 and 61 are cradled in supporting bearings which leave the upper portions of the shafts exposed. For this purpose I secure a pair of brackets 69 to the rear wall 33 of the casing, and on opposite sides of each bracket there are ball bearings 70 and 71 carried by bolts 72 that extend through suitable openings in the bracket. The outer flanges 24 and 25 of the rings 22 and 23 each projecting slightly beyond the cylinder 16, rest upon the shafts 60 and 61 and are driven thereby. The shafts turn slowly and because of the large gear ratio between the drum and the shafts the drum turns very slowly, its rotation being of the order of one-tenth R. P. M.

In the lower left hand corner of the casing, as seen in Fig. 1, there is a gas burner 73. The heated air and products of combustion given off by the burner are free to occupy that portion of the casing above a horizontal baffle 74 and to the left of a narrow baffle 75 at the top of the casing. This heated air and gas are drawn from that portion of the casing through the drum 13 into the compartment 36, from which they are exhausted by the blower 49. Suitable gas controls, indicated generally at 76, are installed in the auxiliary casing 47 at the front of the apparatus where they are readily accessible. Air to be heated enters the casing through an elongated opening, the upper edge of which is indicated at 77 in Fig. 6. This air divides, part of the air entering above the burner as indicated by the arrow A in Fig. 1, and part of it flowing beneath the burner as indicated by the arrow B. This latter air is confined by the baffle 74 and by a narrow baffle 78 mounted approximately opposite the partition 35, and is drawn through that portion of the drum which is positioned between these baffles. This part of the cycle constitutes the purge period, by means of which the adsorbent material is cooled to some extent and the products of combustion remaining from the activating period are carried off. All of that part of the casing to the rear of baffles 75 and 78 is filled with air to be conditioned which is taken into the casing through a large port 79. This air is drawn through that portion of the drum which is exposed between the baffles 75 and 78 and is then forced by the blower 48 through the air cooling unit 11 and back to the rooms which are being air conditioned.

In some cases I propose to eliminate the purge period entirely by indirectly heating the air used for activating, so that no products of combustion pass through the drum. Apparatus designed for this purpose is illustrated in Figs. 12 and 13, where I have shown an air heater comprising a gas burner 80, a series of heat exchange tubes 81 through which the products of combustion pass, a header 82 into which the tubes discharge and a flue 83. The fresh air to be heated enters at the top, flows over the upper surface of header 82, around the flue 83, and downwardly over the surfaces of the tubes 81 into the casing of the dehumidifier unit and into the activating compartment 84 within the drum 13. The lower part of the partition 85 may be bent to the left, as indicated in Fig. 12, because the compartment in this case does not have to accommodate air for purging. The period for adsorption is therefore proportionately increased. The same motor and blower arrangement as are illustrated in Figs. 1 and 6 could be employed in connection with indirect heating, but in Fig. 12 I have illustrated a modification employing a single motor 86 driving both fans 87 and 88, the fan 88 directing dried air upwardly into a cooler 89 and back to the premises.

In those cases in which I employ indirect heating I prefer to arrange the dehumidifying, air cooling and heating units as illustrated in Fig. 14, where the dehumidifying unit 90 is the same approximately as that illustrated in Fig. 1, and where the cooling unit 91 may be approximately like the unit 11 of Fig. 1. The heating unit 92 then stands beside the superimposed units 90 and 91, and is of such height that the air moving horizontally through the heater tubes 81 strikes the dehumidifying unit at the proper level for entrance into the activating compartment of the drum. On the other hand, when direct heating is used, the unit 90 is generally mounted on the floor of a basement or the like and the unit 91 placed above it. It will be noted that in Fig. 14 the blower for the adsorption compartment has been reversed with respect to the position it occupied in Fig. 1, and that the other blower has been swung through an angle of 90° so as to direct the exhaust from the activating compartment upwardly.

Figure 15:
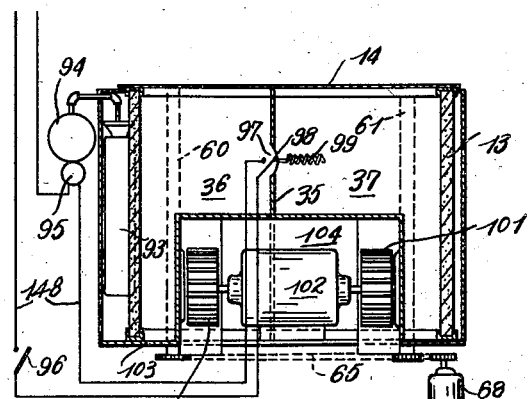
Fig. 15 is a small scale horizontal sectional view corresponding in some respects to the apparatus illustrated in Fig. 12, and showing diagrammatically control elements for the burner and the drum driving mechanism.

Referring now to Fig. 15, I have shown here more or less diagrammatically a dehumidifying unit with direct heating, including a gas burner 93, a diaphragm valve 94 therefor, a solenoid valve 95 by means of which the valve 94 is controlled and an electric circuit for the solenoid valve. This circuit may include a switch 96 that may be operated manually or otherwise, and a switch 97 that is adapted to be closed by a slight excess of pressure in the compartment 37 over that in the compartment 36. This may take the form of a light and very sensitive diaphragm 98 which is normally retracted and partially supported by a light spring 99. The fans or blowers 100 and 101, dependent upon duct considerations, may be identical in size and capacity as here indicated, and may be driven by the same motor 102, or by two separate motors, of the same or different capacities, as the requirements of a given installation may demand.

When the motors are the same size, the compartment 37, being somewhat larger than the compartment 36, enables blower 100 to pull a slightly greater vacuum in compartment 36 than the blower 101 can pull in compartment 37. Accordingly during operation of the blowers the switch 97 is normally closed and the burner 93 operating. Should anything go wrong however so as to disturb this unbalanced pressure condition as between the two compartments, the burner will go out. This is important because it would be dangerous to have any leakage take place from the activating compartment 36 into the adsorbing compartment 37 on account of the gases which would thereby be carried into the air circulating in the premises.

It will be noted also that in Fig. 15 I have shown the front wall 103 of the casing provided with a recess 104 extending into the space within the drum, the motor 102 and the blowers 100 and 101 being located in this recess. This arrangement has an advantage in respect to quietness of operation, inasmuch as the drum with the activating material which it carries encloses these moving parts and helps to deaden the noise of the blowers.

Where two separate motors are employed I provide means to start them one after the other, that which drives the blower for the activating compartment starting first, and the connections being such that the motor for the adsorption compartment cannot function unless that for the activation compartment is running. This is a safety measure. If the adsorption motor were to operate alone the pressure in the adsorption compartment would be less than that in the activation compartment and gases in the activation compartment, including products of combustion where direct heat is used, would be drawn into the adsorption compartment through any leakage opening which might exist, and these gases would thereby find their way into the circulating system of the premises. This can never occur in the use of my apparatus because the adsorption motor cannot run except in conjunction with the activation motor. Also, if either one of the two motors 51 and 52 should cease to operate the heater for the activating air would cease to operate.

In Fig. 16 I have shown diagrammatically a wiring system which may be employed in connection with the invention. In this figure the line wires are indicated at L' and L². 105 is a humidistat so constructed as to close a switch between conductors 106 and 107 when humidity in the premises rises to a predetermined degree. Conductor 107 is connected with a relay coil 108 which is adapted when energized to raise armature 109 and thereby bridge two terminals 110 and 111. The other end of coil 108 is attached to line wire L². Hence, when the humidistat calls for dehumidification, coil 108 is energized and terminals 110 and 111 are connected together. As soon as this happens a circuit is completed through motor 52 as follows: From line wire L' to terminal 110, through armature 109 to terminal 111, through conductors 112 and 113 to binding post 114, through field coil 115 of the motor back to binding post 116, and through conductor 117 back to line wire L². At the same time a circuit is set up through starting coil 118 of motor 52 and capacitor 119 to contact 120 and, by way of centrifugal switch 121 to binding post 116 and back to line wire L² as above. The motor then starts, and as soon as it gets up to speed the centrifugal switch 121 leaves contact 120 and swings over to contact 122, which is connected with a binding post 123. From the latter a conductor 124 leads to a binding post 116' for motor 51. On the latter motor there are two other binding posts 114' and 123', and the internal connections with field coil 115' and starting coil 118' correspond precisely to those of motor 52, and carry similar reference characters. Conductor 112 is connected with binding post 114' by a conductor 113'. From binding post 123' a conductor 125 extends to the primary coil of a step-down transformer 126 which is connected on its other end by a conductor 127 with terminal 111. From that terminal a conductor 128 leads to small motor 68, by means of which the drum is rotated, as previously described, and a return conductor 129 from that motor extends back to the line wire L².

The low voltage portion of the system illustrated in Fig. 16 includes controls for the main gas valve 94, the pilot valve 131 and the automatic igniter 132. The detail construction of these valves and automatic igniter form no part of the present invention, and these parts are included in the illustration in a diagrammatic manner merely for the purpose of making clear one application of the present invention.

From the secondary coil of the transformer 126 a conductor 133 leads to the resistance wire of igniter coil 132, from which conductors 134 and 136 extend to a contact 137 of a two-way switch having a moving arm or finger 138 pivotally mounted at 139. This switch arm is electrically connected to a conductor 135 which extends back to the transformer. The coil 132 when energized ignites gas emerging from a pilot 9, which heats up a thermally responsive element consisting of a link 140 and a lever 141 pivotally connected together at 142 and mounted upon a suitable support by means of pivots 143 and 144. The lower end of lever 141 is connected to a slide rod 145, provided on its extremity with a cam 146. The expansion of the thermal element, when effected by the heat from pilot 9, pushes rod 145 to the left and raises switch arm 138 into engagement with contact 147. The main burner valve 94 is now opened by the following means. A conductor 148 extending from transformer 126 and passing through diaphragm switch 97, previously described, carries current to solenoid 95 which when energized opens valve 94. From this solenoid a conductor 150 leads to contact 147, and thence by way of switch arm 138 and conductor 135 back to the transformer. The pilot valve 131 may be caused to open whenever transformer 126 is energized and to close when the transformer is deenergized. In the drawing a conductor 152 which is in communication with conductor 133 is shown connected with a solenoid 154 that when energized opens valve 131, and the opposite end of the solenoid is connected by a conductor 155 with return conductor 135.

From the foregoing description the mode of operation it is believed will be evident to those skilled in the art. When the drum is assembled it is filled as completely as possible with adsorbent material in granular form. In the event that there should be any reduction in the volume of the adsorbent material because of attrition or for any other reason, thereby creating a small vacant space, that space will of course occur at the top of the drum. Owing to the fact, however, that the drum is rotating in an anti-clockwise direction, as viewed in Fig. 1, this vacant space during operation of the drum will locate itself about as shown at 149 in Fig. 1, it being understood that the size of the space there shown is greatly exaggerated. Rotation of the drum is slow enough to permit the adsorbent material to roll forward and down for a small fraction of an inch after it comes to the top of the drum, so that such vacant space, if any, will always occupy the same angular position. The location of any vacant space just to the left of the partition is better than any other possible location because it is at this point that the greatest rise in temperature of the material occurs, since at this point it comes from the relatively cool adsorbent side of the apparatus into the hot activation side. The greatest rate of expansion of the material, therefore, occurs at that point and tends to compensate for or fill up any vacant space which might otherwise appear. As previously stated, constant movement of the adsorbent particles in the drum is helpful because it prevents their becoming packed together tightly.

If for any reason it becomes necessary to service the drum it is merely necessary for the operator to grasp a handle or hand-hold 121 and pull the drum rearwardly out of the casing. Since the air passes through the drum walls radially inward at all times, whatever dust is carried by the air tends to deposit itself upon the outside of the drum and may be removed by vacuum cleaning the same.

The circuits for starting motor 52 have already been described. As soon as that motor is up to speed and centrifugal switch 121 is in engagement with contact 122, current may flow from line wire L' to terminal 110, through armature 109 to terminal 111, through conductors 112 and 113' to binding post 114', through coil 115' and 118' and switch 121' to binding post 116', through conductor 124 to binding post 123 on motor 52, and by way of contact 122 and centrifugal switch 121 to binding post 116 and back through conductor 117 to line wire L². Motor 51 therefore starts. When it gets up to speed centrifugal switch 121' engages contact 122', throwing out starting coil 118' and connecting coil 115' to binding post 123'. Current then passes from conductor L' through terminal 110, armature 109, terminal 111 and conductor 127 to the primary of transformer coil 126, and thence through conductor 125 to binding post 123', then by way of centrifugal switch 121', binding post 116', conductor 124, binding post 123, contact 122 and switch 121 to binding post 116 and down through conductor 117 to line wire L².

Low voltage current then energizes solenoid 154 and turns on the fuel to pilot 9. Current also passes through igniter coil 132 and heats up the same in order to cause the pilot flame to be ignited. Presently the heat responsive element 140, 141 expands and causes the switch arm 138 to leave contact 137 and engage contact 147. Now, with the pilot burning, it is permissible to turn on the main gas valve 94, and this is done by current passing from the transformer through conductor 148, diaphragm switch 97, solenoid 95, conductor 150, contact 147, switch arm 138 and conductor 135 back to the transformer. If at any time during the operation of the apparatus something should occur to disturb the differential pressure condition as between the two compartments 36 and 37 within the drum, switch 97 would open and the valve 94 would close. If motor 52 should stop, motor 51 must stop also, because the field current for motor 51 must pass through the centrifugal switch 121 of motor 52. If motor 51 should stop for any reason, whether or not motor 52 should stop, then the gas for the activation heater would be turned off at once, because the current for the primary of the transformer coil 126 must flow through both centrifugal switches 121 and 121'. The drive motor 68 begins to function as soon as the relay closes, that is from line wire L' to terminal 110, across armature 109 to terminal 111, and through conductor 128 to the motor and back through conductor 129 to line wire L².

While the entire apparatus is under control of the humidostat 105, it is to be understood that ordinarily it will not be called upon to function except to turn off the apparatus after it has been started with a hand switch 160 and if the rooms being air conditioned have reached a predetermined low humidity, which in many cases will be no oftener than once a day.

Having thus described my invention, I claim:

1. In dehumidifying apparatus, a hollow carrier for moisture adsorbent material, said carrier having a perforate surface of revolution, means for rotating the carrier about the axis of its surface of revolution, a fixed partition extending along said surface of revolution dividing the interior of the carrier into two compartments, a pair of unconnected chambers enclosing said carrier on opposite sides of said partition, one of said chambers having a connection for air to be conditioned and the other chamber having a connection for activating fluid, a pair of blowers of equal capacity for moving air to be conditioned through one compartment and the adjacent chamber and for moving activating fluid through the other compartment and adjacent chamber, the movement in both cases being radial in the same direction and said partition being offset from the middle position, whereby a pressure differential of relatively small proportions may be maintained between the two compartments.

2. In dehumidifying apparatus, a hollow carrier for moisture adsorbent material, said carrier having a perforate surface of revolution, means for rotating the carrier about the axis of its surface of revolution, a fixed partition extending along said surface of revolution, closed compartments on the inner side of said surface of revolution separated from each other by said partition, a pair of unconnected chambers enclosing said carrier on opposite sides of said partition, a pair of blowers of equal capacity for moving air to be conditioned from one of said chambers into one of said compartments through said carrier and exhausting it longitudinally and for moving activating fluid from the other of said chambers into the other of said compartments and exhausting it longitudinally, said partition being offset from the axis toward the activating side of the carrier, whereby the pressure on the activating side is less than that on the adsorption side.

3. In dehumidifying apparatus, a rotating carrier arranged to provide a bed of adsorbent material extending about its axis of rotation, partition means arranged within said carrier to provide a pair of compartments each partially defined by a portion of said bed, a pair of unconnected chambers enclosing said carrier on opposite sides of said partition, and means for moving air to be dehumidified and adsorbent activating fluid from said chambers, respectively, through said compartments by way of their said bed portions and out of said compartments in the same axial direction, and means for inducing said flow by the application of suction to corresponding ends of the two compartments, the parts being so proportioned and arranged that the pressure within both of said compartments shall be sub-atmospheric and that within said activating fluid compartment shall be no greater than that within the other compartment.

4. In dehumidifying apparatus, an adsorbing compartment and an activating compartment, a burner for heating air passing through said activating compartment, pressure responsive means arranged to be subjected to the pressure differential as between said two compartments, and means actuated by said pressure responsive means for controlling the operation of said burner, whereby the burner is permitted to function only when the pressure in the adsorbing compartment is at least as high as that in the activating compartment.

5. In dehumidifying apparatus, an adsorbing compartment and an activating compartment, a partition separating said compartments, a burner for heating the air passing through said activating compartment, a diaphragm exposed to the pressures on opposite sides of said partition, an electric switch adapted to be closed when said diaphragm is shifted by a preponderance of pressure from said adsorbing compartment, an electric control means for turning on said burner, and a circuit including said switch and said control means, whereby the burner is permitted to operate only when the pressure in the adsorbing compartment exceeds that in the activating compartment.

6. In dehumidifying apparatus, an adsorbing compartment and an activating compartment in juxtaposition, a suction fan for circulating air to be conditioned through said adsorbing compartment, another suction fan for circulating activating air through the activating compartment, a motor for each of said fans, means for turning on the motor for said activating fan, and means effective after said activating fan gets up to speed for turning on the motor for said adsorption fan, whereby the fan for the adsorbing compartment cannot operate unless the fan for the activating compartment is in operation.

7. In dehumidifying apparatus, a drum comprising a pair of concentric perforate cylinders mounted with their axes horizontal, moisture adsorbent material in substantially uniform distribution between said cylinders, a fixed vertical partition extending lengthwise of the inner cylinder dividing the interior thereof into two compartments, means for causing the air to be conditioned to pass through the drum on one side of said partition and for causing activating air to pass through the drum on the other side of the partition, and means for revolving the drum about its axis with the upper part of the drum turning toward the activating side, said partition meeting the drum between the uppermost point and the point of maximum looseness of adsorbent material.

8. In apparatus of the class described, a wall, a carrier open at one end and closed at the other and supporting therebetween a mass of adsorbent of generally annular section, said carrier being disposed with its open end at said wall and being mounted to rotate upon an axis perpendicular thereto, partition means extending from said wall and dividing the cavity of said carrier into two compartments, said wall having a pair of openings, one communicating with each of said compartments, and means for moving fluid to be dehumidified through one compartment and activating fluid through the other compartment, the corresponding portions of said adsorbent mass and said wall openings unidirectionally with respect to said wall.

9. In apparatus of the class described, a wall, a carrier open at one end and closed at the other and supporting therebetween a mass of adsorbent of generally annular section, said carrier being disposed with its open end at said wall and being mounted to rotate upon an axis perpendicular thereto, partition means extending from said wall and dividing the cavity of said carrier into two compartments, said wall having a pair of openings, one communicating with each of said compartments, and means for moving fluid under suction simultaneously through said compartments first generally radially through the corresponding portions of said adsorbent mass, and thence generally axially through said wall openings, whereby fluid pressures tend to bear said carrier against said wall.

10. In apparatus of the class described, a wall, a carrier open at one end and closed at the other and supporting therebetween a mass of adsorbent of generally annular section, said carrier being disposed with its open end at said wall and being mounted to rotate upon an axis perpendicular thereto, partition means extending from said wall and dividing the cavity of said carrier into two compartments, said wall having a pair of openings, one communicating with each of said compartments, and separate blower means arranged each to exhaust fluid from one of said compartments through its wall opening.

11. In a machine of the class described, a wall, a carrier open at one end and closed at the other and supporting therebetween a mass of adsorbent of generally annular section, said carrier being disposed with its open end at said wall and being mounted to rotate upon an axis perpendicular thereto, partition means extending from said wall and dividing the cavity of said carrier into two compartments, said wall having a pair of openings, one communicating with each of said compartments, and separate blower means disposed adjacent said wall on the side opposite to said carrier and arranged each to exhaust fluid from one of said compartments through its wall opening.

12. In a machine of the class described, an upright wall, a pair of driven shafts disposed perpendicularly of said wall, a drum borne by said shafts with an open end against said wall and closed at its opposite end, said drum carrying a mass of adsorbent material of generally annular section, partition means mounted on said wall and extending therefrom into the cavity of said drum through the open end thereof to divide the space within the drum into two compartments, bearing means for the wall ends of said shafts, and means for supporting the opposite shaft ends while permitting withdrawal of said drum from said wall by sliding along said shafts and without disturbing said partition means.

13. In apparatus of the class described, a casing having an end wall, a carrier open at one end and closed at the other and supporting therebetween a mass of adsorbent of generally annular cross section, said carrier being disposed within the casing with its open end at said wall and being mounted to rotate upon an axis perpendicular to the wall, partition means extending from said wall and dividing the cavity of said carrier into two compartments, said wall having a pair of openings one communicating with each of said compartments, partition means in said casing for providing a path for air to be dehumidified through the drum into one of said compartments and for providing separate paths for reactivating fluid and purging air through the drum into the other of said compartments, and separate blower means arranged each to exhaust air from one of said compartments through its wall opening.

14. In apparatus of the class described, a wall, a carrier open at one end and closed at the other and supporting therebetween a mass of adsorbent of generally annular section, said carrier being disposed with its open end at said wall and being mounted to rotate upon an axis perpendicular thereto, partition means extending from said wall and dividing the cavity of said carrier into two compartments, said wall having a pair of openings, one communicating with each of said compartments, a thrust rod one end of which engages the closed end of said carrier centrally and the other end of which engages centrally said wall, said rod and said partition being interconnected near said wall, whereby said rod assists in the support of said partition when the carrier is in place and whereby said partition maintains the rod in position when said carrier is withdrawn, and means for moving fluid simultaneously through said compartments, the corresponding portions of said adsorbent mass and said wall openings unidirectionally with regard to said wall.

15. In dehumidifying apparatus, a front wall, a drum type carrier for adsorbent material mounted behind said front wall to turn about an axis perpendicular to said front wall and having an open end engaging said front wall, stationary partition means carried by the front wall for dividing the interior of the drum into adsorbing and activating compartments, blowers mounted in front of said front wall and communicating through openings in said front wall with the interior of the carrier on opposite sides of said partition means for circulating fluid through said compartments, means for heating the fluid circulated through said activating compartment, control mechanism for said heating means mounted in front of said front wall, and mechanism for driving said drum carrier also located in front of said front wall.

FRANK R. HIGLEY.